US009242241B2

(12) United States Patent
Bull et al.

(10) Patent No.: US 9,242,241 B2
(45) Date of Patent: Jan. 26, 2016

(54) COPPER CONTAINING LEVYNE MOLECULAR SIEVE FOR SELECTIVE REDUCTION OF NOX

(75) Inventors: Ivor Bull, Hopewell Junction, NY (US); Ulrich Müller, Neustadt (DE); Bilge Yilmaz, New York, NY (US)

(73) Assignee: BASF SE, Ludwigshafen (DE)

( * ) Notice: Subject to any disclaimer, the term of this patent is extended or adjusted under 35 U.S.C. 154(b) by 656 days.

(21) Appl. No.: 13/501,811

(22) PCT Filed: Oct. 11, 2010

(86) PCT No.: PCT/EP2010/065150
§ 371 (c)(1),
(2), (4) Date: Apr. 13, 2012

(87) PCT Pub. No.: WO2011/045252
PCT Pub. Date: Apr. 21, 2011

(65) Prior Publication Data
US 2012/0208691 A1 Aug. 16, 2012

Related U.S. Application Data

(60) Provisional application No. 61/251,350, filed on Oct. 14, 2009.

(51) Int. Cl.
| | |
|---|---|
| B01J 29/06 | (2006.01) |
| B01J 35/00 | (2006.01) |
| B01J 29/84 | (2006.01) |
| B01J 29/83 | (2006.01) |
| B01J 29/064 | (2006.01) |
| B01J 29/70 | (2006.01) |
| B01J 29/72 | (2006.01) |
| B01D 53/94 | (2006.01) |
| B01J 29/072 | (2006.01) |
| B01J 29/76 | (2006.01) |
| B01J 37/00 | (2006.01) |
| B01J 37/10 | (2006.01) |
| B01J 29/85 | (2006.01) |

(52) U.S. Cl.
CPC ........... *B01J 35/002* (2013.01); *B01D 53/9409* (2013.01); *B01J 29/064* (2013.01); *B01J 29/072* (2013.01); *B01J 29/70* (2013.01); *B01J 29/72* (2013.01); *B01J 29/76* (2013.01); *B01J 29/83* (2013.01); *B01J 29/84* (2013.01); *B01J 37/0009* (2013.01); *B01D 2255/20761* (2013.01); *B01D 2255/50* (2013.01); *B01D 2257/402* (2013.01); *B01D 2257/404* (2013.01); *B01D 2257/406* (2013.01); *B01D 2258/012* (2013.01); *B01J 29/85* (2013.01); *B01J 37/10* (2013.01); *B01J 2229/186* (2013.01); *B01J 2229/36* (2013.01); *Y02C 20/10* (2013.01)

(58) Field of Classification Search
USPC .............. 502/60, 73, 214, 208; 423/700
See application file for complete search history.

(56) References Cited

U.S. PATENT DOCUMENTS

| | | | |
|---|---|---|---|
| 3,459,676 A | 8/1969 | Kerr | |
| 4,086,186 A | 4/1978 | Rubin et al. | |
| 4,220,623 A | 9/1980 | Jahnke et al. | |
| 4,220,632 A | 9/1980 | Pence et al. | |
| 4,485,303 A | 11/1984 | Suzuki | |
| 4,961,917 A | 10/1990 | Byrne | |
| 4,996,322 A * | 2/1991 | Pierantozzi et al. | 564/216 |
| 5,334,367 A | 8/1994 | Rosinski et al. | |
| 6,974,889 B1 * | 12/2005 | Verduijn et al. | 585/528 |
| 7,601,662 B2 * | 10/2009 | Bull et al. | 502/60 |
| 7,645,718 B2 * | 1/2010 | Li et al. | 502/214 |
| 7,998,443 B2 * | 8/2011 | Andersen et al. | 423/213.2 |
| 8,603,432 B2 * | 12/2013 | Andersen et al. | 423/700 |
| 2004/0048734 A1 | 3/2004 | Liu et al. | |
| 2009/0199546 A1 | 8/2009 | Doring | |
| 2009/0199549 A1 | 8/2009 | Doring | |
| 2010/0172828 A1 * | 7/2010 | Althoff et al. | 423/713 |
| 2010/0310440 A1 | 12/2010 | Bull et al. | |
| 2010/0322847 A1 | 12/2010 | Xiao et al. | |
| 2011/0020204 A1 | 1/2011 | Bull et al. | |
| 2011/0056187 A1 | 3/2011 | Seyler et al. | |
| 2011/0076229 A1 | 3/2011 | Trukhan et al. | |
| 2011/0182790 A1 * | 7/2011 | Chandler et al. | 423/213.5 |
| 2011/0300028 A1 | 12/2011 | Bull et al. | |

FOREIGN PATENT DOCUMENTS

| | | |
|---|---|---|
| EP | 0040016 | 11/1981 |
| EP | 0091048 | 10/1983 |
| EP | 0091049 | 10/1983 |
| EP | 0107370 | 5/1984 |
| EP | 0 373 665 | * 6/1990 |

(Continued)

OTHER PUBLICATIONS

PCT International Search Report in PCT/EP2010/065150, mailed Dec. 22, 2010, 6 pgs
Briend, M., et al., "Influence of the Choice of the Template on the Short- and Long-Term Stability of SAPO-34 Zeolite", *J. Phys. Chem*, 99 1995, 8270-8276.
Caullet, P., et al., "Synthesis of LEV-type zeolite from aqueous nonalkaline fluoride aluminosilicate gets", *Zeolites* 15 1995, 139-147.
Inoue, Takayuki, et al., "Synthesis of LEV zeolite by interzeolite conversion method and its catalytic performance in ethanol to olefins reaction", *Microporous and Mesoporous Materials* 122 2009, 149-154.
Poshusta, Joseph C., et al., "Characterization of SAPO-34 membranes by water adsorption", *Journal of membrane Science* 186 2001, 25-40.

(Continued)

*Primary Examiner* — Elizabeth Wood
(74) *Attorney, Agent, or Firm* — Servilla Whitney LLC

(57) ABSTRACT

Aspects of the present invention relates to a copper containing Levyne molecular sieve having a silica to alumina mole ratio less than 30 and a Cu:Al atomic ratio less than 0.45, wherein the Levyne molecular sieve retains at least 60% of its surface area after exposure to a temperature of from about 750° C. to about 950° C. in the present of up to 10 volume percent water vapor for a time ranging from about 1 to about 48 hours.

9 Claims, 10 Drawing Sheets

(56) References Cited

FOREIGN PATENT DOCUMENTS

| WO | WO-2008/106519 | 9/2008 |
|---|---|---|
| WO | WO-2008/118434 | 10/2008 |
| WO | WO-2008/132452 | 11/2008 |
| WO | WO-2009/135588 | 11/2009 |
| WO | WO-2009/141324 | 11/2009 |
| WO | WO-2010/043891 | 4/2010 |

OTHER PUBLICATIONS

Prakash, A. M., et al., "SAPO-35 Molecular Sieve: Synthesis, Characterization, and Adsorbate Interactions of Cu(II) in CuH-SAPO-35", *Cham. Mater.* 10 1998, 932-941.

Tuoto, C. V., et al., "Synthesis of Levyne-Type Zeolites From Systems Containing Methylquinuclidine", *Materials Engineering*, vol. 5 1994, 9 pgs.

* cited by examiner

COPPER CONTAINING LEVYNE MOLECULAR SIEVE FOR SELECTIVE REDUCTION OF NOX

CROSS-REFERENCE TO RELATED APPLICATIONS

This application is the national stage entry of PCT/EP2010/065150, filed on Oct. 11, 2010, which claims priority to U.S. Provisional Application No. 61/251,350, filed on Oct. 14, 2009, both of which are incorporated herein by reference in their entireties.

BACKGROUND

Both synthetic and natural zeolites and their use in promoting certain reactions, including the selective reduction of nitrogen oxides with ammonia in the presence of oxygen, are well known in the art. Zeolites are aluminosilicate crystalline materials having rather uniform pore sizes which, depending upon the type of zeolite and the type and amount of cations included in the zeolite lattice, range from about 3 to 10 Angstroms in diameter. Levyne (LEV) is a small pore zeolite with 8 member-ring pore openings (~4.8×3.6 Angstroms) accessible through its 2-dimensional porosity (as defined by the International Zeolite Association). A cage like structure results from the connection of double six-ring building units by 4 rings.

Levyne can be synthesized using various template agents and OH-sources. These various synthesis routes result in Levyne-type materials with different names such as Levyne, LZ-132, LZ-133, Nu-3, ZSM-45, ZK20, SSZ-17. U.S. Pat. No. 3,459,676 first disclosed the synthesis of ZK-20 having a silica to alumina ratio from 4 to 11 using 1-methyl-1-azonia-4-azabicyclo[2,2,2]octane. EP 91,048 and EP 91,049 describe the synthesis of LZ-132 and LZ-133 using methylquinuclidine. EP 40,016 describes the synthesis of Nu-3 (10 to 300 $SiO_2:Al_2O_3$) with 1-aminoadamantane or methylquiniclidine. EP 107,370, U.S. Pat. No. 4,485,303, U.S. Pat. No. 4,086,186 U.S. Pat. No. 5,334,367, describes the synthesis of ZSM-45 (10 to 80 $SiO_2:Al_2O_3$) with salts of dimethyldiethylammonium, choline or cobaltinium. Caullett et al. described the synthesis of Levyne with quinuclidine and methylamine in Zeolites, 1995, 15, 139-147. Touto et al., describe the synthesis of Levyne with methylquinucline in Materials Engineering, 1994, 175-182 and Microporous and Mesoporous Materials, 1998, 247-257. Inoue et al. describe the hydrothermal conversion of FAU to Levyne with choline hydroxide in Microporous and Mesoporous Materials, 2009, 149-154.

The reduction of nitrogen oxides with ammonia to form nitrogen and $H_2O$ can be catalyzed by metal-promoted zeolites to take place preferentially to the oxidation of ammonia by the oxygen or to the formation of undesirable side products such as $N_2O$, hence the process is often referred to as the "selective" catalytic reduction ("SCR") of nitrogen oxides, and is sometimes referred to herein simply as the "SCR" process.

The catalysts employed in the SCR process ideally should be able to retain good catalytic activity over the wide range of temperature conditions of use, for example, 200° C. to 600° C. or higher, under hydrothermal conditions and in the presence of sulfur compounds. High temperature and hydrothermal conditions are often encountered in practice, such as during the regeneration of the catalyzed soot filter, a component necessary for the removal of soot particles in the exhaust gas treatment system.

Metal-promoted zeolite catalysts including, among others, iron-promoted and copper-promoted zeolite catalysts, for the selective catalytic reduction of nitrogen oxides with ammonia are known. Iron-promoted zeolite beta (U.S. Pat. No. 4,961,917) has been an effective commercial catalyst for the selective reduction of nitrogen oxides with ammonia. Unfortunately, it has been found that under harsh hydrothermal conditions, for example exhibited during the regeneration of a catalyzed soot filter with temperatures locally exceeding 700° C., the activity of many metal-promoted zeolites begins to decline. This decline is often attributed to dealumination of the zeolite and the consequent loss of metal-containing active centers within the zeolite.

WO 2008/106519 discloses a catalyst comprising: a zeolite having the CHA crystal structure and a mole ratio of silica to alumina greater than 15 and an atomic ratio of copper to aluminum exceeding 0.25. The catalyst is prepared via copper exchanging $NH_4^+$-form CHA with copper sulfate or copper acetate. The catalyst resulting from copper sulfate ion-exchange exhibits NOx conversion from 45 to 59% at 200° C. and ~82% at 450° C. Copper acetate exchange results in a material with NOx conversion after aging of 70 and 88% at 200 and 450° C., respectively. These materials offer improvement in low temperature performance and hydrothermal stability in comparison to FeBeta. However, Chabazite remains an expensive material due to the cost of the trimethyladamantyl ammonium hydroxide necessary for its synthesis.

WO 2008/132452 discloses a number of zeolite materials that can be loaded with iron and/or copper with improvements in NOx conversion compared to Fe/Beta, Cu/Beta and Cu/ZSM-5. Example 2 indicates Cu/Nu-3 (a Levyne-type material) as such a material. This example states that an ammonium exchange was carried out before an aqueous copper exchange using copper nitrate. It is stated that multiple aqueous ion-exchanges were carried out to target 3 wt % Cu (3.76 wt % CuO). No details of the ion-exchange experiments are disclosed. Additionally, no details of critical composition parameters for the zeolite are given such as $SiO_2:Al_2O_3$ or alkali metal content. As indicated above Nu-3 can be synthesized with a wide range of $SiO_2:Al_2O_3$ (10 to 300). Example 6 indicates that the material is aged at 750° C. in 5% steam for 24 hours. FIG. 5 and FIG. 6 indicate the SCR performance of Cu/Nu-3 fresh and aged with comparison to other materials such as Cu/SAPO-34. FIG. 6 indicates that following hydrothermal aging the NOx conversion at 200 and 450° C. are significantly inferior to the Chabazite-type SAPO-34 technology after aging, with ~60% versus ~75% NOx conversion at 200° C. and ~60% versus ~80% at 450° C. However, no clear mention of test conditions for Cu/Nu-3 can be found.

Briend at al. report that SAPO-34 was unstable to a humid environment at temperatures below about 100° C. as reflected in a loss of structure (J. Phys. Chem., 1995, Vol. 99, p 8270-8276). However, at temperatures above 100° C. stability was not an issue.

Poshusta et al. observe an instability to humidity at low temperature with SAPO-34 membranes (J. Membrane Science, 2001, Vol. 186, p 25-40).

WO 2008/118434 indicates that a Levyne material that can retain at least 80% of its surface area and micropore volume after hydrothermal aging at 900° C. in 10% steam for 1 to 16 hours would be suitable for application in SCR. However, no synthesis or catalytic data are disclosed.

WO 2010/043891 indicates small pore zeolites (having a maximum ring size of eight tetrahedral atoms), including Levyne (LEV), as improved catalysts in the selective catalytic reduction of NOx with ammonia. Levynite, Nu-3, LZ-132 and ZK-20 are reported. It is indicated that large crystal size results in improved catalyst stability with catalytic data provided for only Cu/Chabazite. NOx conversion is reported at 200° C. and 400° C. Crystals larger than 0.5 micrometers are claimed.

U.S. Pat. No. 4,220,632 discloses $NH_3$—SCR process using zeolites in the Na- or H-form with pore sizes of 3-10 Angstroms. Zeolite X, Mordenite and a natural zeolite are disclosed in the examples.

SUMMARY

Aspects of the present invention relate to a copper containing Levyne molecular sieve having a silica to alumina mole ratio less than 30 and a Cu:Al atomic ratio less than 0.45, wherein the Levyne molecular sieve retains at least 60% of its surface area after exposure to a temperature of from about 750° C. to about 950° C. in the present of up to 10 volume percent water vapor for a time ranging from about 1 to about 48 hours. Other aspects relate to methods of making and using said copper-containing Levyne molecular sieve.

DETAILED DESCRIPTION

Task

Figure 1:
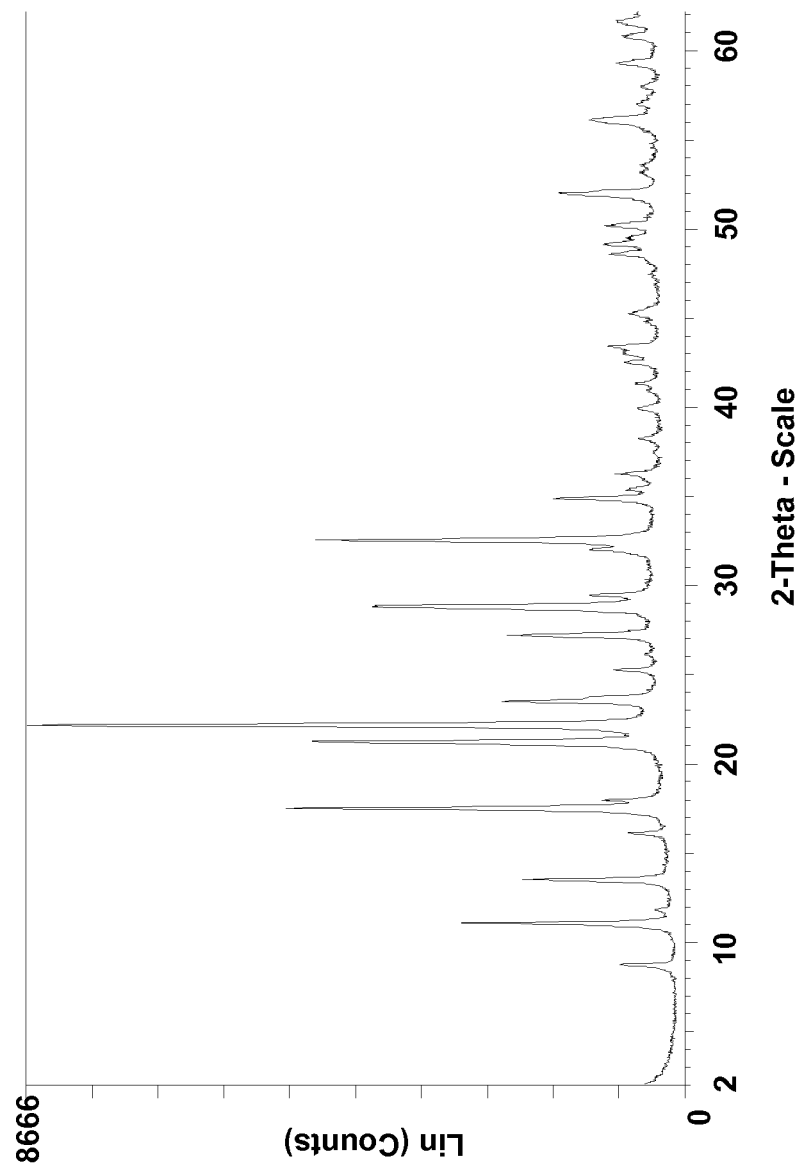
FIG. 1 is a x-ray diffraction pattern for a sample prepared according to the Examples.

Thus, there is an on-going task to provide cost-effective hydrothermally stable catalysts for SCR applications. Lower cost catalysts are desired which exhibit similar SCR performance and stability to the state of the art SCR catalysts. In addition, the catalysts should show high activity over a wide temperature range. Hydrothermal stability to temperatures greater than 750° C. is desired. The specific requirement on hydrothermal stability is dependent on the configuration of the catalyst system utilized in the exhaust treatment.

Surprisingly, it was found that Cu/LEV catalysts with lower $SiO_2:Al_2O_3$ exhibit improved performance even after severe hydrothermal aging when the Cu content is carefully controlled.

Cu/LEV offers significant cost reduction over Cu/SSZ-13 due to the use of lower cost templates. Additionally, no low-temperature stability issues exist for this aluminosilicate based composition as has been identified for some silicoaluminophosphate compositions.

Product

Therefore, aspects of the present invention relate to a copper containing Levyne molecular sieve having a silica to alumina mole ratio less than 30, preferably less than 28, more preferably less than 26, even more preferred less than 23, and a Cu:Al atomic ratio less than 0.45, wherein the Levyne molecular sieve retains at least 60% of its surface area after exposure to a temperature of from about 750° C. to about 950° C. in the present of up to 10 volume percent water vapor for a time ranging from about 1 to about 48 hours.

In an preferred embodiment, the Copper containing Levyne molecular sieve retains at least 70%, preferred 80%, more preferred 90%, of its surface area after exposure to a temperature of from about 750° C. to about 950° C. in the present of up to 10 volume percent water vapor for a time ranging from about 1 to about 48 hours.

As used in this specification and the appended claims, the singular forms "a", "an" and "the" include plural referents unless the context clearly indicates otherwise. Thus, for example, reference to "a catalyst" includes a mixture of two or more catalysts, and the like.

A molecular sieve can be zeolitic—zeolites—or non-zeolitic, and zeolitic and non-zeolitic molecular sieves can have the Levyne crystal structure, which is also referred to as the LEV structure by the International Zeolite Association.

$SiO_2/Al_2O_3$

Preferably the copper containing Levyne molecular sieve has a mole ratio of silica to alumina from about 4 to about less than 30. Preferably the copper containing Levyne has a mole ratio of silica to alumina in the range from about 10 to about less than 30, preferred in the rage from about 10 to about 28, more preferred in the range from about 15 to about 28, even more preferred in the range from about 15 to about 26.

Cu/Al

Preferably the atomic ratio of copper to aluminum is from about 0.2 to about less than 0.45. Even more preferred the ratio of copper to aluminum is from about 0.25 to about 0.4.

Cu/H

Preferably the atomic ratio of copper to proton is less than 7, more preferred less than 4. More preferred the ratio is in the range from about 0.25 to about 4. Even more preferred the ratio of copper to proton is from about 0.25 to about 2. The proton content of the zeolite can be calculated as number of moles Al minus number of moles ($2*Cu^{2+}$).

Moles Cu Per 100 g Zeolite

Preferably the moles Cu per 100 g zeolite (calculated as moles) are more than 0.01. More preferred the moles Cu per 100 g zeolite are in the range from about 0.02 to about 0.046. Even more preferred in the range from about 0.025 to about 0.04.

Elevated Temperatures

The copper containing Levyne molecular sieve is exposed to an elevated temperature. The temperature according to this invention can be from ca. 750 to ca. 950° C., preferably from 750 to 850° C.

Surface Area 750° C.

Preferably the surface area of the copper containing Levyne molecular sieve after exposure to a temperature of 750° C. in the present of up to 10 volume percent water vapor for a time ranging from about 1 to about 48 hours, preferably for a time ranging from about 6 to about 48 hours, even more preferred for a time ranging from about 6 to about 24 hours, retains at least 60%, even more preferred retains at least 65%, even more preferred retains at least 70%, even more preferred retains at least 75%, even more preferred retains at least 80%, even more preferred retains at least 85% compared to the surface area before the exposure to the elevated temperature.

Surface Area 850° C.

Preferably the surface area of the copper containing Levyne molecular sieve after exposure to a temperature of 850° C. in the present of up to 10 volume percent water vapor for a time ranging from about 1 to about 48 hours retains at most less than 80%, preferably less than 75% after exposure to a temperature of 850° C.

Surface Area

Preferably the Langumuir surface area, determined according to DIN ISO 9277, of the copper containing Levyne molecular sieve is in the range from about 400 to about 900; more preferred in the range from about 600 to about 900.

XRD Pattern

The x-ray diffraction pattern was collected on a Bruker D 4 Endeavor diffractometer with 4° Söller slits, V20 variable divergence slits, and a scintillator counter as X-ray detector. The samples to be analyzed were measured from 2° to 70° 2theta with a step width of 0.02° and step time of 2 seconds are typical. The x-ray diffraction pattern was matched to the LEV topology reported in Collection of Simulated XRD Powder Patterns for Zeolites by M. M. Treacy et al.

Wt. % Copper

The Cu content of the copper containing Levyne molecular sieve, calculated as CuO, is preferably at least about 2 wt.-% and even more preferably at least about 2.5 wt.-%, in each case based on the total weight of the calcined Levyne molecular sieve. Even more preferably, the Cu content of the Levyne molecular sieve, calculated as CuO, is in the range of up to about 15 wt.-%, more preferably of up to about 4 wt.-%, and even more preferably of up to about 3.5 wt.-%, in each case based on the total weight of the calcined Levyne molecular sieve reported on a volatile free basis. Therefore, preferred ranges of the Cu content of the Levyne molecular sieve, calculated as CuO, are from about 2 to about 15 wt.-%, more preferably from about 2 to about 4 wt.-%, and even more preferably from about 2.5 to about 3.5 wt.-%, and even more preferably from about 2.5 to about 3.25 wt.-%, in each case based on the total weight of the calcined Levyne molecular sieve. All wt.-% values are reported on a volatile free basis.

Free Copper

In addition to the copper that is exchanged to increase the level of copper associated with the exchanged sites in the structure of the zeolite, non-exchanged copper in salt from may be present in the Levyne molecular sieve, so called free copper.

Sodium Content

Preferably the copper containing Levyne molecular sieve has a sodium content (reported as $Na_2O$ on a volatile free basis) of below 30000 ppm, more preferred of below 5000 ppm, even more preferred below 1000 ppm and most preferred below 100 ppm.

Additional Metal

The copper containing Levyne molecular sieve may contain one or more transition metals. Preferably the Levyne molecular sieve may contain transition metals capable of oxidizing NO to $NO_2$ and/or storing $NH_3$. The transition metal is preferably selected from the group consisting of Fe, Co, Ni, Zn, Y, Ce, Zr and V. Generally, all suitable sources for Fe, Co, Ni, Zn, Y, Ce, Zr and V can be employed. By way of example, nitrate, oxalate, sulphate, acetate, carbonate, hydroxide, acetylacetonate, oxide, hydrate, and/or salts such as chloride, bromide, iodide may be mentioned.

In addition, the copper containing Levyne molecular sieve may contain one or more lanthanides. A preferred lanthanide source is, among others, lanthanum nitrate.

In addition, the copper containing Levyne molecular sieve may contain one or more precious metals (e.g. Pd, Pt).

TOC

Preferably, the calcined copper containing Levyne molecular sieve has a TOC content of 0.1 wt.-% or less, based on the total weight of the Levyne molecular sieve.

Thermal Stability

Preferably, the calcined copper containing Levyne molecular sieve has a thermal stability, determined via differential thermal analysis or differential scanning calorimetry, in the range of from about 900 to about 1400° C., preferably in the range of from about 1100 to about 1400° C., more preferably in the range of from about 1150 to about 1400° C. For example, the measurement of thermal stability is described in PCT/EP2009/056036 at page 38.

LEV

Preferably the copper containing Levyne molecular sieve includes all materials described by the zeolite structure code LEV. Preferably the copper containing Levyne molecular sieve is an aluminosilicate composition. Most preferably the copper containing Levyne molecular sieve is a ZSM-45 or a Nu-3. ZSM-45 is preferably crystallized from templating agents derived from choline or dimethyldiethylammonium salts.

SCR Activity

Aged: 750° C.

The copper containing Levyne molecular sieve, preferably ZSM-45, is hydrothermally aged. Typical conditions for this hydrothermal aging are: the copper containing Levyne molecular sieve is placed in a tube furnace in a gas flow containing 10% $H_2O$, 10% $O_2$, balance $N_2$ at a space velocity of 12,500 $h^{-1}$ for 24 hrs at 750° C. Preferably the 750° C.-aged NO conversion at 200° C. is at least 70%, more preferred at least 75%, even more preferred at least 80%, measured at a space velocity of gas hourly space velocity of 30,000 $h^{-1}$. Preferably the 750° C.-aged NO conversion at 450° C. is at least 70%, more preferred at least 75%, even more preferred at least 80%, measured at a space velocity of gas hourly space velocity of 30,000 $h^{-1}$. Preferably the 750° C.-aged NO conversion at 200° C. is at least 50%, more preferred at least 60%, even more preferred at least 65%, measured at a space velocity of gas hourly space velocity of 80,000 $h^{-1}$. Preferably the 750° C.-aged NO conversion at 450° C. is at least 65%, more preferred at least 70%, even more preferred at least 75%, measured at a space velocity of gas hourly space velocity of 80,000 $h^{-1}$.

Aged: 850° C.

The copper containing Levyne molecular sieve, preferably ZSM-45, is hydrothermally aged. Typical conditions for this hydrothermal aging are: the copper containing Levyne molecular sieve is placed in a tube furnace in a gas flow containing 10% $H_2O$, 10% $O_2$, balance $N_2$ at a space velocity of 12,500 $h^{-1}$ for 6 hrs at 850° C. Preferably the 850° C.-aged NO conversion at 200° C. is at least 70%, more preferred at least 75%, even more preferred at least 80%, measured at a space velocity of gas hourly space velocity of 30,000 $h^{-1}$. Preferably the 850° C.-aged NO conversion at 450° C. is at least 70%, more preferred at least 75%, even more preferred at least 80%, measured at a space velocity of gas hourly space velocity of 30,000 $h^{-1}$.

Preferably the 850° C.-aged NO conversion at 200° C. is at least 50%, more preferred at least 60%, even more preferred at least 65%, measured at a space velocity of gas hourly space velocity of 80,000 $h^{-1}$. Preferably the 850° C.-aged NO conversion at 450° C. is at least 70%, more preferred at least 75%, even more preferred at least 80%, measured at a space velocity of gas hourly space velocity of 80,000 $h^{-1}$ Preferably the copper containing Levyne molecular sieve exhibits an aged NOx conversion at 200° C. of at least 50% measured at a gas hourly space velocity of 30000 h$^{-1}$. Preferably the copper containing Levyne molecular sieve exhibits an aged NOx conversion at 450° C. of at least 70% measured at a space velocity of gas hourly space velocity of 30,000 h$^{-1}$. The catalysts were hydrothermally aged in a tube furnace in a gas flow containing 10% H$_2$O, 10% O$_2$, balance N$_2$ at a volume-based space velocity of 12,500 h$^{-1}$ for 24 hrs at 750° C. More preferred the aged NOx conversion at 200° C. is at least 60% and at 450° C. at least 75% measured at a gas hourly space velocity of 30,000 h$^{-1}$, even more preferred the aged NOx conversion at 200° C. is at least 70% and at 450° C. at least 80% measured at a gas hourly space velocity of 30,000 h$^{-1}$, most preferred, the aged NOx conversion at 200° C. is at least 80% and at 450° C. at least 85% measured at a gas hourly space velocity of 30,000 h$^{-1}$ The SCR activity measurement has been demonstrated in the literature, for example WO 2008/106519.

Process

Therefore, aspects of the present invention relate to a process for the preparation of copper containing Levyne molecular sieve having a silica to alumina mole ratio less than 30 and a Cu:Al atomic ratio less than 0.45, wherein the Levyne molecular sieve retains at least 60% of its surface area after exposure to a temperature of 750° C. in the present of up to 10 volume percent water vapor for a time ranging from about 1 to about 48 hours. Preferably, copper acetate and/or an ammoniacal solutions of copper ions are used as copper source.

Ammoniacal Solutions of Copper Ions

Panias et al. (Oryktos Ploutos (2000), 116, 47-56) report the speciation of divalent copper ions in aqueous ammoniacal solutions. Amino complexes of divalent copper Cu(NH3)$_n^{2+}$ are in practice the predominant forms in which copper is encountered in mildly acidic to strongly alkaline ammoniacal solutions. The ion Cu(NH$_3$)$_4^{2+}$ is the most important ion of the Cu$^{2+}$—NH$_3$—H$_2$O system. It shows a wide region of stability varying from mildly acidic solutions with a pH of 5 to strongly alkaline solutions with a pH of 14. The hydroxyl complexes of divalent copper are met with in the Cu$_2$+—NH$_3$—H$_2$O system only in very strongly alkaline solutions with a pH greater than 12 and in dilute ammoniacal solutions with a total ammonia concentration less than 0.1 M. In ammoniacal solutions copper is encountered in the form of free Cu$^{2+}$ ions only in highly acidic aqueous solutions.

Synthesis of the Na+-LEV

Synthesis of the Na+-zeolites having the LEV structure can be carried out according to various techniques known in the art (for example U.S. Pat. No. 4,495,303, EP 91,048 and EP 91,049).

Concentration

The copper concentration of the liquid copper solution used in the copper ion-exchange is preferably in the range from about 0.001 to about 1 molar, more preferred in the range from about 0.01 to about 0.5 molar, even more preferred in the range from about 0.05 to about 0.3 molar, even more preferred in the range from about 0.05 to about 0.2 molar.

Liquid:Solid-Ratio

The liquid to solid ratio which is defined here as the weight of water and copper salt used to prepare the Cu solution relative to the dry weight of the starting zeolite used in the copper exchange step is preferably in the range from about 0.1 to about 800, more preferred in the range from about 2 to about 80, even more preferred in the range from about 2 to about 20, even more preferred in the range from about 2 to about 10, even more preferred in the range from about 4 to about 8.

Reaction Temperature

The reaction temperature of the copper-exchange step is preferably in the range of about 15 to about 100° C., more preferred in the range of about 20 to about 60° C. In the case where a ammoniacal solutions of copper ions is used as copper source, the reaction temperature is preferably in the range of about 20 to about 35° C., even more preferred in the range of about 20 to about 25° C.

Addition Order of Reactants

The reactants zeolite, copper source and water may be added in any order. The zeolite can be added to a premade solution of copper salt or complex, which can be at room temperature or already preheated to the ion-exchange temperature. Alternatively, the zeolite can be preslurried in deionized water followed by addition of copper salt or complex at room temperature or already preheated to the ion-exchange temperature. Additionally, the zeolite powder or filtercake can be preslurried in an amount of water to enable transportation to the reaction vessel by pumping and added to a solution of copper acetate. Again this can be done with or without preheating.

Reaction Time

The reaction time of the ion-exchange step is preferably in the range of about 1 second to about 48 hours, more preferred in the range of about 30 seconds to about 8 hours, even more preferred in the range of about 1 minute to about 5 hours, even more preferred in the range of about 10 minutes to about 1 hour.

Reaction Conditions

The aqueous solution is preferably suitably stirred. Typical values as far as said stirring or rotation is concerned are in the range of from 10 to 500 rpm (revolutions per minute). In general, the stirring speed is decreased as the reactor size increases.

pH: Use of Acidic Additives

Preferably, the pH of the ion-exchange step is in the range of about 1 to about 6, more preferably in the range of about 2 to about 6, and even more preferably in the range of about 3 to about 5.5. In the case where an ammoniacal solution of copper ions is used as copper source the pH of the ion-exchange step is in the range of about 5 to about 14, more preferably in the range of about 6 to about 12, and even more preferably in the range of about 8 to about 11.

Depending on the starting materials employed, it may be necessary to adjust the pH of the aqueous solution so that the pH has above-described values. Preferably, the pH is adjusted to above-described values using acetic acid or ammonia which may be added as aqueous solution.

Cu:Al

Using copper acetate, the ratio of Cu to Al in the copper solution for the copper-exchange step is preferably in the range of about 0.25 to about 2, more preferred in the range from about 0.5 to 2, even more preferred in the range from about 0.5 to 1.5, even more preferred in the range from about 0.5 to about 1.2. Using ammoniacal solutions of copper ions, the ratio of Cu to Al is preferably in the range of about 0.001 to about 1, more preferred in the range from about 0.25 to about 0.8, even more preferred in the range from about 0.25 to about 0.6, even more preferred in the range from about 0.25 to about 0.5.

Repeating Ion-Exchange

The copper-exchange step may be repeated for 0 to 10 times, preferably 0 to 2 times.

Posttreatment

After the copper exchange step, the exchange slurry containing the inventive copper containing Levyne molecular sieve is suitably separated from the mother liquor. Prior to separation, the temperature of the mother liquor may be suitably decreased to a desired value employing a suitable cooling rate. This separation can be effected by all suitable methods known to the skilled person. The Levyne molecular sieve may be washed at least once with a suitable washing agent known to the skilled person. After separation and optionally washing, the copper containing Levyne molecular sieve may be dried and calcined.

Shape

The Levyne molecular sieve according to the present invention may be provided in the form of a powder or a sprayed material. In general, the powder or sprayed material can be shaped without any other compounds, e.g. by suitable compacting, to obtain moldings of a desired geometry, e.g. tablets, cylinders, spheres, or the like.

By way of example, the powder or sprayed material is admixed with or coated by a suitable refractory binder. By way of example, the binder may be a zirconium precursor. The powder or the sprayed material, optionally after admixing or coating by a suitable refractory binder, may be formed into a slurry, for example with water, which is deposited upon a suitable refractory carrier.

The Levyne molecular sieve of the present invention may also be provided in the form of extrudates, pellets, tablets or particles of any other suitable shape, for use as a packed bed of particulate catalyst, or as shaped pieces such as plates, saddles, tubes, or the like.

Catalyst

Thus, aspects of the present invention relate to a catalyst containing a copper containing Levyne molecular sieve disposed on a substrate.

The substrate may be any of those materials typically used for preparing catalysts, and will usually comprise a ceramic or metal honeycomb structure. Any suitable substrate may be employed, such as a monolithic substrate of the type having fine, parallel gas flow passages extending therethrough from an inlet or an outlet face of the substrate, such that passages are open to fluid flow therethrough (referred to as honeycomb flow through substrates). The substrate can also be a wall-flow filter substrate, where the channels are alternately blocked, allowing a gaseous stream entering the channels from one direction (inlet direction), to flow through the channel walls and exit from the channels from the other direction (outlet direction). In addition, suitable carriers/substrates as well as suitable coating processes are described in the international patent application having the application number PCT/EP2009/056036 and in WO 2008/106519. PCT/EP2009/056036 and WO 2008/106519 are incorporated by reference.

SCR/Exhaust Gas Treatment System

In general, the copper containing Levyne molecular sieve described above can be used as molecular sieve, adsorbent, catalyst, catalyst support or binder thereof. Especially preferred is the use as catalyst.

Moreover, aspects of the present invention relate to a method of catalyzing a chemical reaction wherein the copper containing Levyne molecular sieve according to the present invention is employed as catalytically active material.

Among others, said catalyst may be employed as catalyst for the selective reduction (SCR) of nitrogen oxides NOx; for the oxidation of $NH_3$, in particular for the oxidation of $NH_3$ slip in diesel systems; for the decomposition of $N_2O$; for soot oxidation; for emission control in Advanced Emission Systems such as Homogeneous Charge Compression Ignition (HCCI) engines; as additive in fluid catalytic cracking (FCC) processes; as catalyst in organic conversion reactions; or as catalyst in "stationary source" processes. For applications in oxidation reactions, preferably an additional precious metal component is added (e.g. Pd, Pt).

Therefore, aspects of the present invention also relate to a method for selectively reducing nitrogen oxides NOx by contacting a stream containing NOx with a catalyst containing the copper containing Levyne molecular sieve according to the present invention under suitable reducing conditions; to a method of oxidizing $NH_3$, in particular of oxidizing $NH_3$ slip in diesel systems, by contacting a stream containing $NH_3$ with a catalyst containing the copper containing Levyne molecular sieve according to the present invention under suitable oxidizing conditions; to a method of decomposing of $N_2O$ by contacting a stream containing $N_2O$ with a catalyst containing the copper containing Levyne molecular sieve according to the present invention under suitable decomposition conditions; to a method of controlling emissions in Advanced Emission Systems such as Homogeneous Charge Compression Ignition (HCCI) engines by contacting an emission stream with a catalyst containing the copper containing Levyne molecular sieve according to the present invention under suitable conditions; to a fluid catalytic cracking FCC process wherein the copper containing Levyne molecular sieve according to the present invention is employed as additive; to a method of converting an organic compound by contacting said compound with a catalyst containing the copper containing Levyne molecular sieve according to the present invention under suitable conversion conditions; to a "stationary source" process wherein a catalyst is employed containing the copper containing Levyne molecular sieve according to the present invention.

In particular, the selective reduction of nitrogen oxides wherein the Levyne molecular sieve according to the present invention is employed as catalytically active material is carried out in the presence of ammonia or urea. While ammonia is the reducing agent of choice for stationary power plants, urea is the reducing agent of choice for mobile SCR systems. Typically, the SCR system is integrated in the engine and vehicle design and, also typically, contains the following main components: SCR catalyst containing the Levyne molecular sieve according to the present invention; a urea storage tank; a urea pump; a urea dosing system; a urea injector/nozzle; and a respective control unit.

Method of Reducing NOx

Therefore, aspects of the present invention also relate to a method for selectively reducing nitrogen oxides NOx, wherein a gaseous stream containing nitrogen oxides NOx, for example exhaust gas formed in an industrial process or operation, preferably also containing ammonia and/or urea, is contacted with the Levyne molecular sieve according to the present invention.

The term nitrogen oxides, NOx, as used in the context of the present invention designates the oxides of nitrogen, especially dinitrogen oxide ($N_2O$), nitrogen monoxide (NO), dinitrogen trioxide ($N_2O_3$), nitrogen dioxide ($NO_2$), dinitrogen tetroxide ($N_2O_4$), dinitrogen pentoxide ($N_2O_5$), nitrogen peroxide ($NO_3$).

The nitrogen oxides which are reduced using a catalyst containing the Levyne molecular sieve according to the present invention or the Levyne molecular sieve obtainable or obtained according to the present invention may be obtained by any process, e.g. as a waste gas stream. Among others, waste gas streams as obtained in processes for producing adipic acid, nitric acid, hydroxylamine derivatives, caprolactame, glyoxal, methyl-glyoxal, glyoxylic acid or in processes for burning nitrogenous materials may be mentioned.

Especially preferred is the use of a catalyst containing the Levyne molecular sieve according to the present invention or the Levyne molecular sieve obtainable or obtained according to the present invention for removal of nitrogen oxides NOx from exhaust gases of internal combustion engines, in particular diesel engines, which operate at combustion conditions with air in excess of that required for stoichiometric combustion, i.e., lean.

Therefore, aspects of the present invention also relate to a method for removing nitrogen oxides NOx from exhaust gases of internal combustion engines, in particular diesel engines, which operate at combustion conditions with air in excess of that required for stoichiometric combustion, i.e., at lean conditions, wherein a catalyst containing the Levyne molecular sieve according to the present invention or the Levyne molecular sieve obtainable or obtained according to the present invention is employed as catalytically active material. The selective reduction of NOx implies that $N_2$ should be the main product whereas side products such as $N_2O$ are minimized.

Exhaust Gas Treatment System

Another aspect of the present invention relates to an exhaust gas treatment system comprising an exhaust gas stream optionally containing ammonia and/or urea and a catalyst containing a copper containing Levyne molecular sieve, obtainable or obtained by above-described process, disposed on a substrate, a catalyzed soot filter and a diesel oxidation catalyst.

The catalyzed soot filter may be upstream or downstream of said catalyst. The diesel oxidation catalyst is preferably upstream of said catalyst. Preferably said diesel oxidation catalyst and said catalyzed soot filter are upstream from said catalyst.

Preferably, the exhaust is conveyed from the diesel engine to a position downstream in the exhaust system, preferably containing NOx, where a reductant is added and the exhaust stream with the added reductant is conveyed to said catalyst.

For example, a catalyzed soot filter, a diesel oxidation catalyst and a reductant are described in WO 2008/106519 which is incorporated by reference.

The following examples shall further illustrate the process and the materials of the present invention.

EXAMPLES

1. Hydrothermal Synthesis of Levyne Samples 1.1 Hydrothermal Synthesis of 31 $SiO_2$:$Al_2O_3$ Levyne was crystallized as described in U.S. Pat. No. 4,495,303 using diethyldimethylammonium hydroxide as the template and sodium hydroxide as further source of OH. The material was recovered by filtration and dried before calcining at 600° C. to produce the Na-form of Levyne (example 1).

Chemical analysis showed the material to have 31 $SiO_2$: $Al_2O_3$, and 0.11 wt % of $Na_2O$ on a volatile free basis. XRD indicated that pure Levyne had been obtained (see FIG. 1).

1.2 Hydrothermal Synthesis of 29 $SiO_2$:$Al_2O_3$

Levyne was crystallized as described in U.S. Pat. No. 4,495,303 using diethyldimethylammonium hydroxide as the template. The material was recovered by filtration and dried before calcining at 600° C. to produce the Na-form of Levyne (example 2).

Figure 2:
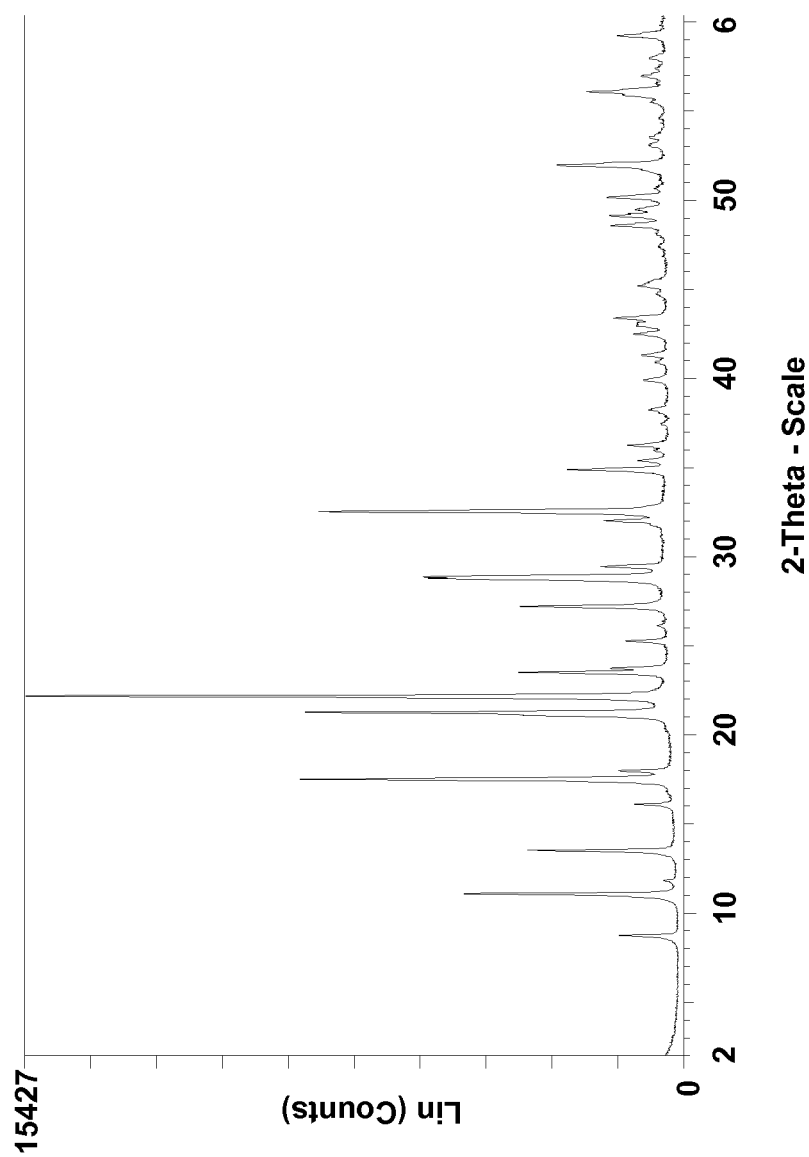
FIG. 2 is a x-ray diffraction pattern for a sample prepared according to the Examples.

Chemical analysis showed the material to have 29 $SiO_2$: $Al_2O_3$, and 0.88 wt % of $Na_2O$ on a volatile free basis. XRD indicated that pure Levyne had been obtained (see FIG. 2).

1.3 Hydrothermal synthesis of 26 $SiO_2$:$Al_2O_3$

Levyne was crystallized as described in U.S. Pat. No. 4,495,303 using diethyldimethylammonium hydroxide as the template. The material was recovered by filtration and dried before calcining at 600° C. to produce the H-form of Levyne (example 3).

Figure 3:
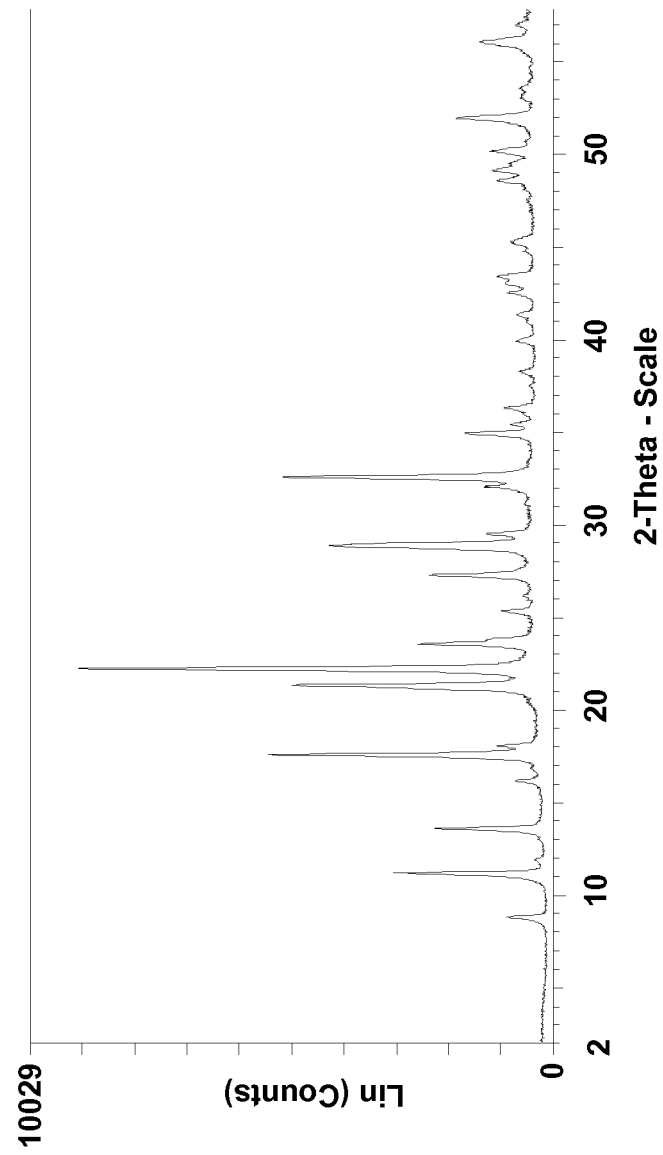
FIG. 3 is a x-ray diffraction pattern for a sample prepared according to the Examples.

Chemical analysis showed the material to have 26 $SiO_2$: $Al_2O_3$, and <0.01 wt % of $Na_2O$ on a volatile free basis. XRD indicated that pure Levyne had been obtained (see FIG. 3).

1.4 Hydrothermal Synthesis of 22 $SiO_2$:$Al_2O_3$

Levyne was crystallized as described in U.S. Pat. No. 4,495,303 using diethyldimethylammonium hydroxide as the template and sodium hydroxide as further source of OH. The material was recovered by filtration and dried before calcining at 600° C. to produce the Na-form of Levyne (example 4).

Figure 4:
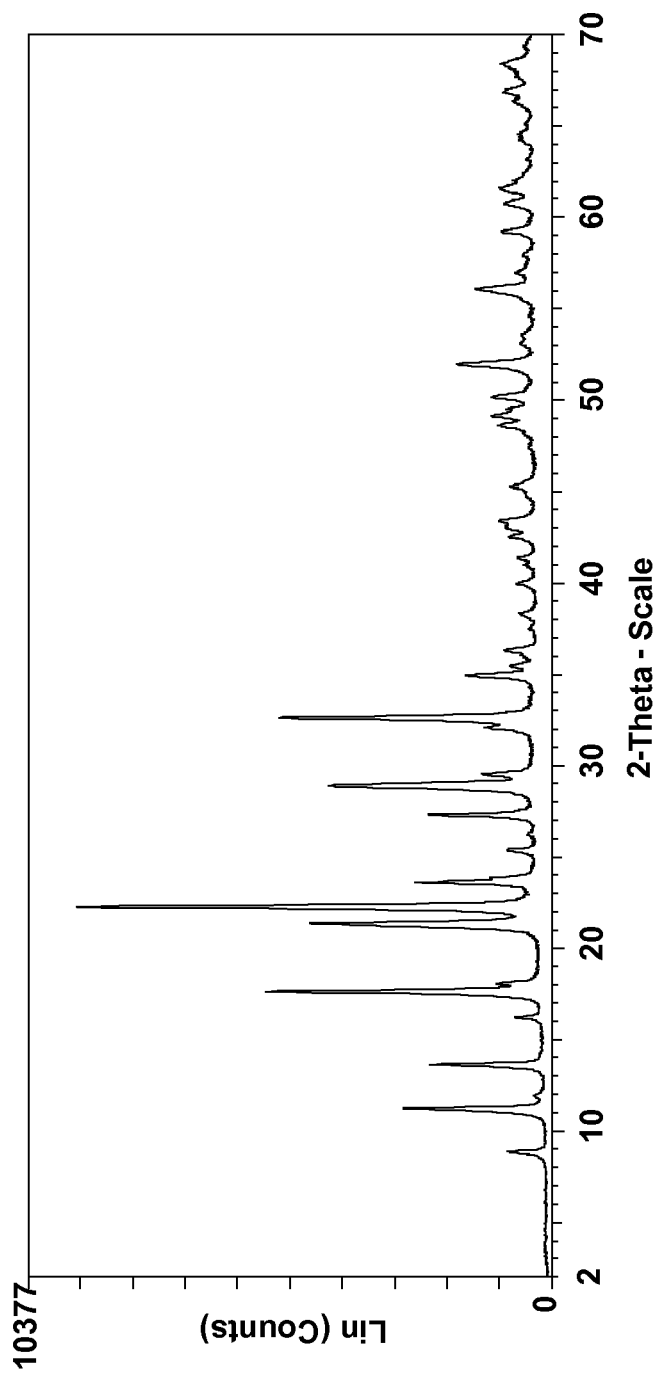
FIG. 4 is a x-ray diffraction pattern for a sample prepared according to the Examples.

Chemical analysis showed the material to have 22 $SiO_2$: $Al_2O_3$, and 0.81 wt % of $Na_2O$ on a volatile free basis. XRD indicated that pure Levyne had been obtained (see FIG. 4).

2. Ammonium Exchange of Examples 1, 2 and 4

2.1 Reagents and Suspension Preparation

The following starting materials were employed:

Ammonium nitrate

Deionized water

Sodium Levyne from example 1, 2 and 4 described in sections 1.1, 1.2 and 1.4, respectively 2.2 Ion-Exchange Conditions and Chemical Analysis Table 1 details the exchange conditions. The 0.125 M solution of ammonium nitrate was prepared by dissolving the appropriate amount of ammonium nitrate in deionized water before heating to 60° C. in a stirred jacketed 4 L glass reactor. Then the alkali form of Levyne was added to the aqueous solution of ammonium nitrate. The slurry was stirred at 250 rpm throughout the experiment. The volume of the exchange slurry was kept constant at a liquid:solid ratio of 10:1 which was defined above. The exchange slurry was kept for 1 hour at 60° C., and then filtered hot (without additional cooling) over a Buechner funnel with appropriate filterpaper. The filtercake was then washed with batches of 1 L deionized water until the conductivity of the washwater reached 200 µS $cm^{-1}$. All filtercake samples were washed with room temperature washwater. Table 1 summarizes the chemical analysis of the resulting products.

TABLE 1

| Ammonium exchange details. | | | |
|---|---|---|---|
| | Parent material example # | | |
| | Example 1 | Example 2 | Example 4 |
| | $NH_4$-form example # | | |
| | Example 1-$NH_4$ | Example 2-$NH_4$ | Example 4-$NH_4$ |
| Number of exchanges | 1 | 2 | 3 |
| $SiO_2$:$Al_2O_3$ | 32 | 29 | 23 |
| $Na_2O$ (wt %) | <0.01 | 0.02 | 0.01 |

3 Copper Exchange 3.1 Reagents and Suspension Preparation

The following starting materials were employed:

Copper Acetate Monohydrate

Deionized water

NH4-Levyne (example 1-NH$_4$, example 2-NH$_4$ and example 4-NH$_4$) and H-Levyne (example 3)

3.2 Ion-Exchange Conditions and Chemical Analysis

Table 2 lists the important synthesis parameters for the ion-exchange in the preparation of examples a to p. The copper-containing examples a through f were prepared from example 4-NH4. The copper-containing examples g through k were prepared from the H-Levyne described in example 3. The copper-containing example l was prepared from example 2-NH$_4$. The copper-containing examples m through p were prepared from example 1-NH$_4$.

A copper acetate solution was prepared by dissolving copper acetate monohydrate in the appropriate amount of deionized water in a jacketed glass reactor. This solution was heated to 60° C. with stirring before addition of the required quantity of the parent NH$_4$ or H-Levyne. Typically, a liquid to solid ratio of 20 was employed with the exception of example H where the liquid to solid ratio was 10. The temperature of 60° C. was maintained for 1 hour. After 1 hour of ion-exchange the slurry was filtered hot over a Buechner funnel. The filtercake was then washed with deionized water until the conductivity of the washwater reached 200 µS cm$^{-1}$. The sample was washed with room temperature washwater. The resulting powder was then dried in an oven at 120° C. for 16 hours. Table 2 also summarizes the CuO and Na$_2$O loading of all resulting products. All values are reported on a volatile free basis. Cu:Al and Cu:H were then calculated.

Chemical analysis, reported in Table 2, indicates a slight variability in SiO$_2$:Al$_2$O$_3$ which is shown in Table 4 to impact the catalytic performance.

g of water were added slowly and the paste was mixed for about 5 minutes to homogenize. This paste was then pressed in a hand-made press with an extruding hole of 2 mm diameter and 10 cm length. The resulting extrudates were dried at 120° C. for 5 hours and calcined at 540° C. for 5 hours. The extrudate was then sized into pellets and sieved to separate a pellet size of 0.5 to 1 mm. This size fraction was used for testing in the reactor. The sieves used were obtained from the company Retsch (500 µm sieve (S/N 04025277) and a 1 mm sieve (S/N 04009529) both having a diameter of 200 mm and height of 25 mm). The resultant catalysts are referred to as the fresh state meaning that they have not been subjected to any hydrothermal aging.

Catalyst examples inherit the same example nomenclature as the copper containing powder described in Table 2. That is, Catalyst Example A in tables 3 and 4 is the catalyst prepared as described in section 4 from example a in Table 2. Table 3 reports the surface area data and Table 4 reports the catalytic data.

5. Aging

The aging reactor was composed of a 1 mm thick steel tube (grade 1.4841 from Buhlmann Group) with diameters of 500 mm height and 18 mm internal diameter. A nickel mantle based furnace was used to heat the reactor to the target reaction temperature which was monitored by an internal thermocouple at the location of the sample. The steam was prepared by heating controlled amounts of water at 150° C. through a steel presteamer before mixing with the remaining gases in a

TABLE 2

Copper acetate exchange conditions, chemical analysis and key compositional parameters for Cu-Levyne.

| | Example a | Example b | Example c | Example d | Example e | Example f | Example g | Example h |
|---|---|---|---|---|---|---|---|---|
| Cu concentration (M) | 0.0100 | 0.0250 | 0.0375 | 0.0500 | 0.0700 | 0.1000 | 0.0100 | 0.0500 |
| CuO (wt %) | 1.28 | 2.16 | 2.61 | 3.50 | 3.82 | 4.96 | 1.44 | 2.12 |
| Na$_2$O (wt %) | 0.010 | 0.010 | 0.010 | 0.060 | 0.010 | 0.01 | ND | ND |
| SiO$_2$:Al$_2$O$_3$ | 22 | 23 | 22 | 23 | 22 | 23 | 26 | 26 |
| Cu:Al | 0.11 | 0.21 | 0.24 | 0.34 | 0.36 | 0.48 | 0.15 | 0.23 |
| Cu:H | 0.15 | 0.35 | 0.48 | 1.06 | 1.26 | 11.61 | 0.22 | 0.42 |
| moles Cu per 100 g zeolite (moles) | 0.016 | 0.027 | 0.033 | 0.044 | 0.048 | 0.062 | 0.018 | 0.027 |
| Cu Yield (%) | 80 | 54 | 44 | 44 | 34 | 31 | 90 | 53 |

| | Example i | Example j | Example k | Example l | Example m | Example n | Example o | Example p |
|---|---|---|---|---|---|---|---|---|
| Cu concentration (M) | 0.0250 | 0.0375 | 0.0500 | 0.05 | 0.01 | 0.025 | 0.05 | 0.07 |
| CuO (wt %) | 2.96 | 3.36 | 3.95 | 3.30 | 1.14 | 2.04 | 2.92 | 3.43 |
| Na$_2$O (wt %) | ND | ND | ND | ND | ND | ND | ND | ND |
| SiO$_2$:Al$_2$O$_3$ | 26 | 27 | 26 | 28 | 32 | 32 | 32 | 31 |
| Cu:Al | 0.31 | 0.38 | 0.42 | 0.39 | 0.15 | 0.27 | 0.39 | 0.44 |
| Cu:H | 0.85 | 1.54 | 2.81 | 1.73 | 0.21 | 0.57 | 1.69 | 3.89 |
| moles Cu per 100 g zeolite (moles) | 0.037 | 0.042 | 0.050 | 0.041 | 0.014 | 0.026 | 0.037 | 0.043 |
| Cu Yield (%) | 74 | 56 | 50 | 41 | 72 | 51 | 37 | 31 |

4. Preparation of Catalyst

Catalyst Examples A to P

The powder was first prepared as an extrudate before testing. A typical preparation would involve adding 18 g of water to 20 g of dried powder in a Stephan-Werke GmbH mixer (Model No.: 0ZDe042/4s) at a mixing rate of 80 revolutions per minute. This was mixed until homogenous which took about 10 minutes. Then 0.5 g of polyethyleneoxide (PEO) were added and mixed until homogeneous which took 2 minutes. 2.5 wt % PEO was added to mixture as a binder. Then 2 static mixer. The gases together with the steam were then passed through a preheater to enable the target temperature.

The extrudates formed as described in section 4 were hydrothermally aged in a tube furnace in a gas flow containing 10% H$_2$O, 10% O$_2$, balance N$_2$ at a space velocity of 12,500 h$^{-1}$ for 24 hours at 750° C. or 6 hours at 850° C. Aging at 750° C. is considered lean hydrothermal aging. Aging at 850° C. is considered severe hydrothermal aging.

Table 3 reports the surface area values for fresh and aged states of Catalyst Examples A to P. Table 4 reports the catalytic data for the fresh and aged states of the same Catalyst examples.

TABLE 3

Surface Area data for Catalyst Examples A to P in fresh and aged states as well as surface area retention after aging.

|  | Catalyst Example A | Catalyst Example B | Catalyst Example C | Catalyst Example D | Catalyst Example E | Catalyst Example F | Catalyst Example G | Catalyst Example H |
|---|---|---|---|---|---|---|---|---|
| Fresh Langmuir ($m^2/g$) | 763.2 | 753.4 | 754.2 | 738.7 | 723.3 | 705.7 | 769.3 | 768 |
| 750° C. Aged Langmuir ($m^2/g$) | 700.4 | 694.1 | 683.3 | 690 | 675.3 | 654.1 | 701.5 | 708.2 |
| 850° C. Aged Langmuir ($m^2/g$) | 570.1 | 588.5 | 550.6 | 541.2 | 378.2 | 73.5 | 291.7 | 467.9 |
| 750° C. Aged Langmuir retention (%) | 91.8 | 92.1 | 90.6 | 93.4 | 93.4 | 92.7 | 91.2 | 92.2 |
| 850° C. Aged Langmuir retention (%) | 74.7 | 78.1 | 73.0 | 73.3 | 52.3 | 10.4 | 37.9 | 60.9 |

|  | Catalyst Example I | Catalyst Example J | Catalyst Example K | Catalyst Example L | Catalyst Example M | Catalyst Example N | Catalyst Example O | Catalyst Example P |
|---|---|---|---|---|---|---|---|---|
| Fresh Langmuir ($m^2/g$) | 757 | 771 | 744.3 | 749.4 | 799.5 | 742.9 | 729.3 | 730.7 |
| 750° C. Aged Langmuir ($m^2/g$) | 685.5 | 674 | 648.2 | 435 | 401.6 | 356.8 | 301.2 | 276 |
| 850° C. Aged Langmuir ($m^2/g$) | 54.6 | 39.5 | 20.4 | 26.4 | 77.9 | 58.8 | 47.7 | 42 |
| 750° C. Aged Langmuir retention (%) | 90.6 | 87.4 | 87.1 | 58.0 | 50.2 | 48.0 | 41.3 | 37.8 |
| 850° C. Aged Langmuir retention (%) | 7.2 | 5.1 | 2.7 | 3.5 | 9.7 | 7.9 | 6.5 | 5.7 |

TABLE 4

Catalytic performance of Catalyst Examples A to P in fresh and aged states.

| | | Catalyst Example A | Catalyst Example B | Catalyst Example C | Catalyst Example D | Catalyst Example E | Catalyst Example F | Catalyst Example G | Catalyst Example H |
|---|---|---|---|---|---|---|---|---|---|
| Space Velocity = 80,000 $h^{-1}$ | 750° C. Aged NO Conversion at 200° C. (%) | 9 | 31 | 51 | 73 | 71 | 60 | 20 | 42 |
| | 750° C. Aged NO Conversion at 450° C. % | 52 | 68 | 78 | 81 | 83 | 66 | 55 | 70 |
| | 850° C. Aged NO Conversion at 200° C. (%) | 12 | 35 | 53 | 64 | 45 | 5 | 15 | 30 |
| | 850° C. Aged NO Conversion at 450° C. (%) | 50 | 65 | 70 | 74 | 63 | 36 | 50 | 63 |
| Space Velocity = 30,000 $h^{-1}$ | 750° C. Aged NO Conversion at 200° C. (%) | 16 | 50 | 79 | 81 | 85 | 76 | 33 | 69 |
| | 750° C. Aged NO Conversion at 450° C. (%) | 75 | 82 | 88 | 83 | 84 | 70 | 72 | 83 |
| | 850° C. Aged NO Conversion at 200° C. (%) | 24 | 63 | 70 | 80 | 70 | 7 | 30 | 60 |
| | 850° C. Aged NO Conversion at 450° C. (%) | 66 | 83 | 75 | 75 | 68 | 57 | 70 | 70 |

| | | Catalyst Example I | Catalyst Example J | Catalyst Example K | Catalyst Example L | Catalyst Example M | Catalyst Example N | Catalyst Example O | Catalyst Example P |
|---|---|---|---|---|---|---|---|---|---|
| Space Velocity = 80,000 $h^{-1}$ | 750° C. Aged NO Conversion at 200° C. (%) | 51 | 46 | 47 | 36 | 14 | 23 | 24 | 24 |
| | 750° C. Aged NO Conversion at 450° C. % | 68 | 66 | 60 | 55 | 38 | 50 | 56 | 50 |
| | 850° C. Aged NO Conversion at 200° C. (%) | 5 | 1 | 2 | 2 | 5 | 1 | 1 | 1 |
| | 850° C. Aged NO Conversion at 450° C. (%) | 22 | 20 | 19 | 17 | 16 | 18 | 18 | 27 |
| Space Velocity = 30,000 $h^{-1}$ | 750° C. Aged NO Conversion at 200° C. (%) | 68 | 60 | 75 | 62 | 27 | 40 | 48 | 45 |
| | 750° C. Aged NO Conversion at 450° C. (%) | 69 | 70 | 70 | 63 | 57 | 60 | 61 | 60 |
| | 850° C. Aged NO Conversion at 200° C. (%) | 7 | 2 | 0 | 3 | 9 | 4 | 2 | 8 |
| | 850° C. Aged NO Conversion at 450° C. (%) | 35 | 38 | 38 | 34 | 30 | 40 | 40 | 58 |

6. Catalytic Testing

Catalyst Examples A to P

The aged catalysts samples obtained from sections 4 and 5 (750 and 850° C. aged states) were evaluated for selective catalytic reduction of NOx activity using the following reactor set up:

The reactor is composed of a 1 mm thick steel tube (grade 1.4541 from Buhlmann Group) with diameters of 500 mm height and 18 mm internal diameter. A copper mantle based furnace was used to heat the reactor to the target reaction temperature which was monitored by an internal thermocouple at the location of the sample.

5 ml of sample is loaded into the reactor and secured with a plug of silica wool at each end of the sample. The sample height is controlled by filling the empty reactor volume with an inert silica based material (Ceramtek AG—product #1.080001.01.00.00; 0.5 to 1 mm-45 g at the bottom and 108 g at the top of the sample).

An inlet gas mixture was formed containing 500 ppm NO, 500 ppm $NH_3$, 10% $O_2$, 5% steam and balance He. The steam was prepared by heating controlled amounts of water at 150° C. through a steel presteamer (grade 1.4541 from Buhlmann, dimensions were 6 mm internal diameter and 900 mm length) before mixing with the remaining gases in a static mixer. This gas mixture then passed through a preheater set at 250° C. and static mixer before entering the SCR reactor described in the previous paragraph.

The DeNOx activity was measured under steady state conditions by measuring the NOx, $NH_3$ and $N_2O$ concentrations at the outlet using a FTIR spectrometer. Samples were tested at reaction temperatures of 200 and 450° C. Furthermore, they were tested at a volume-based gas hourly space velocity of 30,000 and 80,000 $h^{-1}$. NO conversion was then calculated as (NO outlet concentration (ppm)/NO inlet concentration (ppm))*100. $N_2O$ make was also recorded as concentration in ppm.

FIGS. 5 to 9 report the DeNOx activity of Catalyst Examples A to P, in their aged states, at reaction temperatures of 200 and 450° C. at the aforementioned space velocities. $N_2O$ make for all samples was below 11 ppm at 200° C. and below 37 ppm at 450° C.

Figure 5:
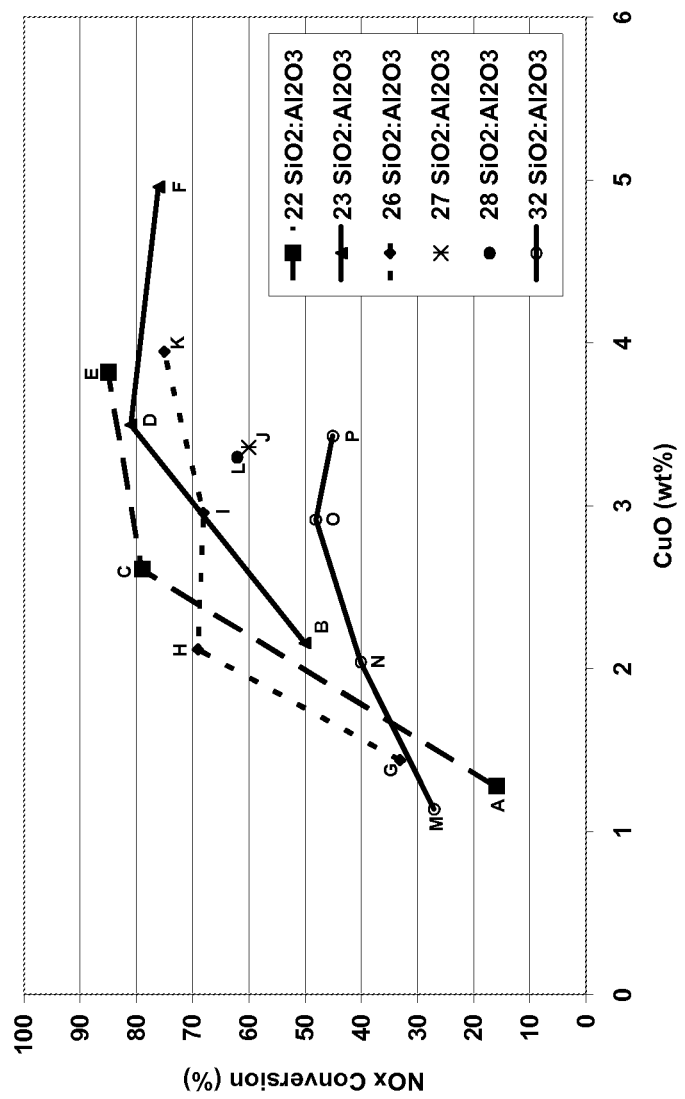
FIG. 5 is a graph of the NOx conversion for samples prepared according to the Examples.

FIG. 5 indicates 750° C. aged DeNOx activity (%) versus CuO loading (wt %) at 200° C. for Catalyst Examples A to P when measured at a volume based space velocity of 30,000 $h^{-1}$.

Figure 6:
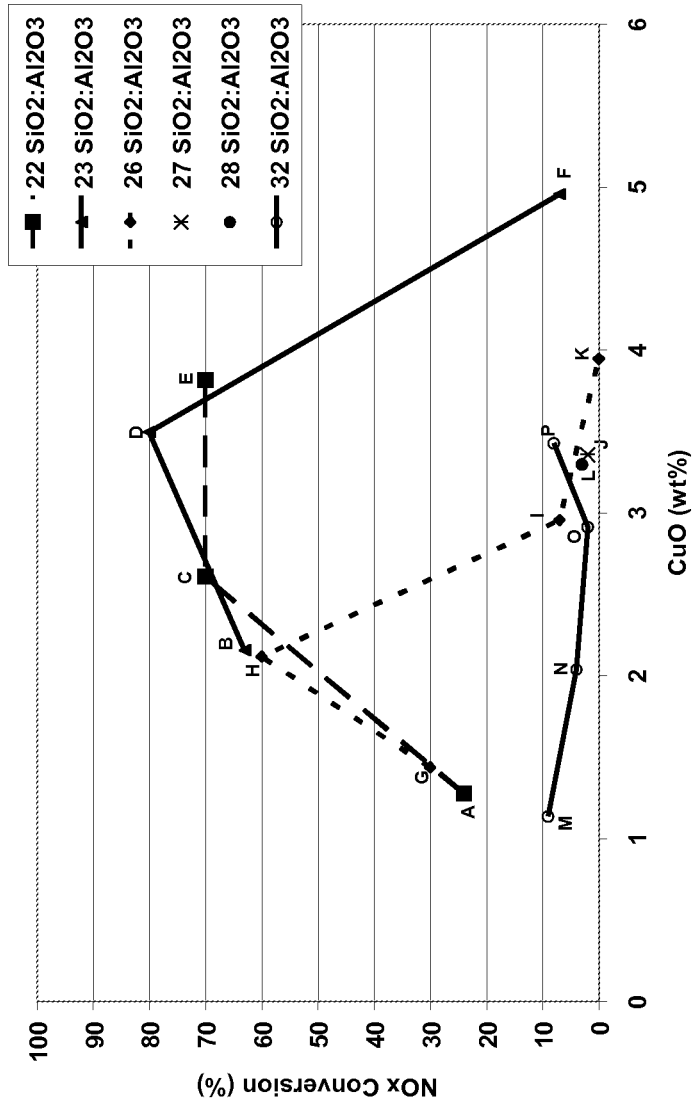
FIG. 6 is a graph of the NOx conversion for samples prepared according to the Examples.

FIG. 6 indicates 850° C. aged DeNOx activity (%) versus CuO loading (wt %) at 200° C. for Catalyst Examples A to P when measured at a volume based space velocity of 30,000 $h^{-1}$.

Figure 7:
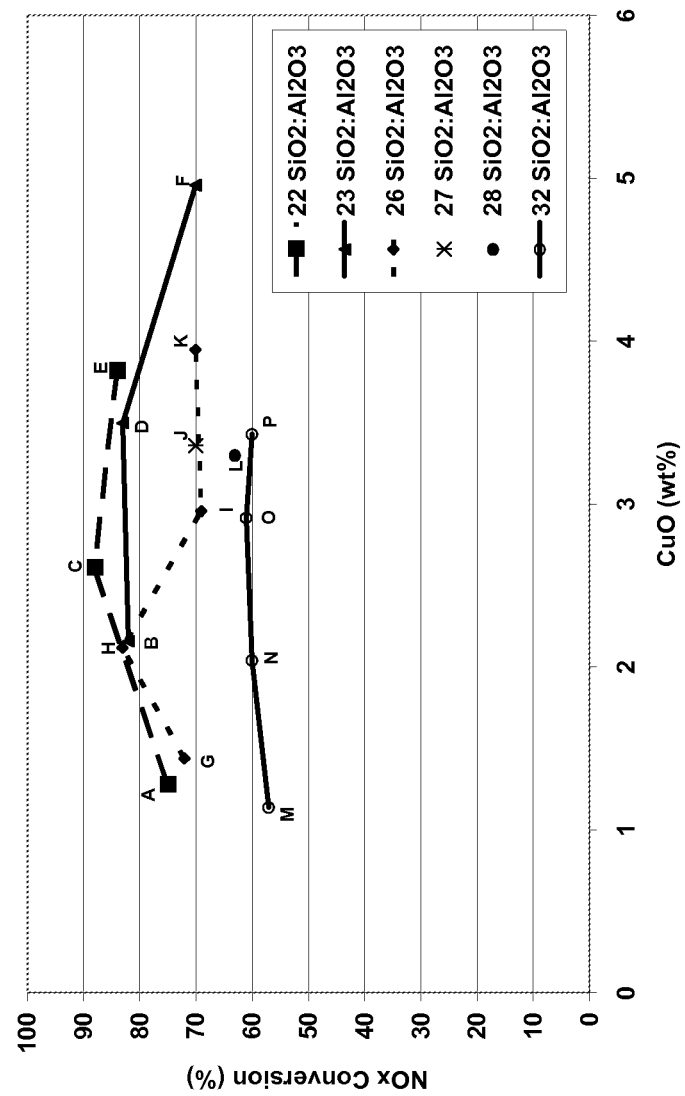
FIG. 7 is a graph of the NOx conversion for samples prepared according to the Examples.

FIG. 7 indicates 750° C. aged DeNOx activity (%) versus CuO loading (wt %) at 450° C. for Catalyst Examples A to P when measured at a volume based space velocity of 30,000 $h^{-1}$.

Figure 8:
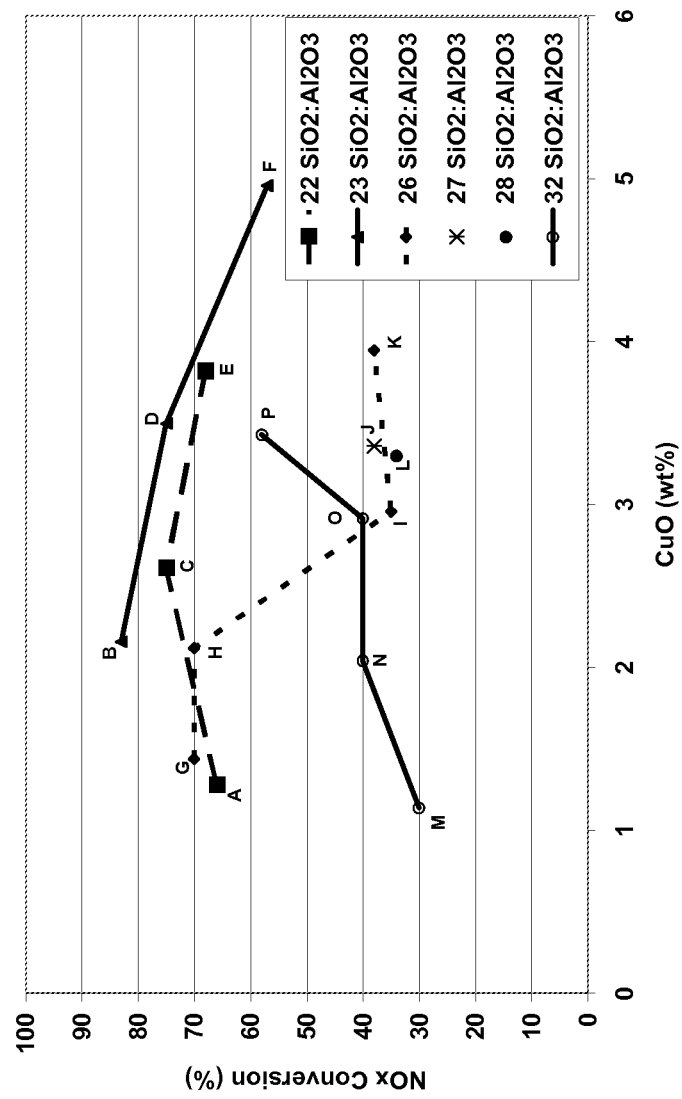
FIG. 8 is a graph of the NOx conversion for samples prepared according to the Examples.

FIG. 8 indicates 850° C. aged DeNOx activity (%) versus CuO loading (wt %) at 450° C. for Catalyst Examples A to P when measured at a volume based space velocity of 80,000 $h^{-1}$.

Figure 9:
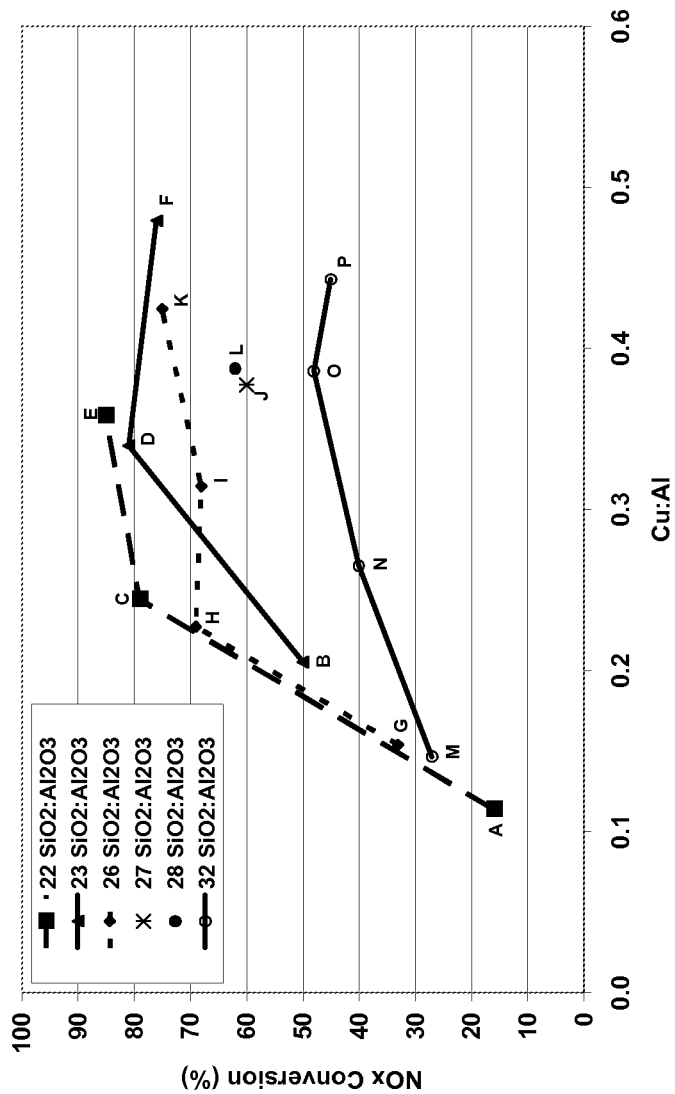
FIG. 9 is a graph of the NOx conversion for samples prepared according to the Examples.

FIG. 9 indicates 750° C. aged DeNOx activity (%) versus Cu:Al at 200° C. for Catalyst Examples A to P when measured at a volume based space velocity of 30,000 $h^{-1}$.

Figure 10:
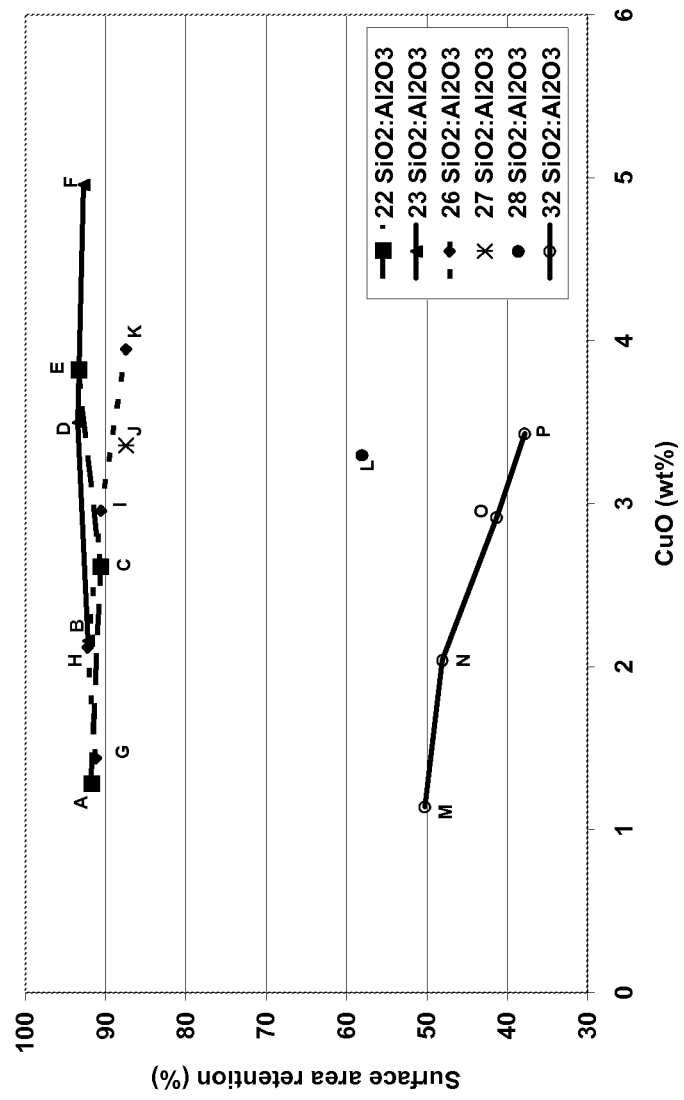
FIG. 10 is a graph of the surface area retention for samples prepared according to the Examples.

FIG. 10 indicates the surface area retention of Catalyst Examples A to P after aging at 750° C. with respect to CuO loading (wt %).

Comparative Example 1

Commercially Available FeBeta

A commercially available FeBeta was used as a reference material. The composition of the material is ~36 $SiO_2$:$Al_2O_3$ and ~1.9 wt % $Fe_2O_3$.

Comparative Example 2

Cu/ZSM-5

A ZSM-5 was commercially obtained from Zeolyst and was copper exchanged for use as a reference material. The composition of the CBV2314 starting material was 23 $SiO_2$:$Al_2O_3$ and 0.05 wt % $Na_2O$. The copper exchange procedure was carried out as detailed in section 3 where the copper concentration was 0.1 M and the liquid to solid ratio was 10:1. The composition of the resulting product was 24 $SiO_2$:$Al_2O_3$ with 3.28 wt % CuO and <0.01 wt % $Na_2O$.

Comparative Example 3

Aging

Catalysts were prepared from comparative examples 1 and 2 as described in section 4 before hydrothermally aging as described in section 5. Both catalysts were aged at 750° C., in 10% steam for 24 hours at a volume based space velocity of 12,500 $h^{-1}$.

Comparative Example 4

Catalytic Testing

Aged catalysts were then tested as described in section 6 at volume based space velocities of 30,000 and 80,000 $h^{-1}$. Table 4 indicates the DeNOx activity for both aged Fe/Beta and aged Cu/ZSM-5.

TABLE 4

| Sample | Space velocity = 30,000 $h^{-1}$ | | Space velocity = 80,000 $h^{-1}$ | |
| --- | --- | --- | --- | --- |
| | Fe/Beta | Cu/ZSM-5 | Fe/Beta | Cu/ZSM-5 |
| NO conversion at 200° C. (%) | 20 | 61 | 10 | 40 |
| NO conversion at 450° C. (%) | 89 | 69 | 82 | 60 |

8. Comparison to Prior Art

FeBeta was an effective catalyst for the selective catalytic reduction of NOx with ammonia, but it does not fulfill the low temperature requirements or provide the necessary hydrothermal stability to meet tightening environmental regulations. WO 2008/106519, WO 2008/132452 and WO 2008/118434 all disclose CuSSZ-13 as a SCR catalyst which improves low temperature performance and hydrothermal stability when compared to FeBeta. SSZ-13 is a chabazite technology where significant cost is contributed by the expensive template, trimethyladamantyl ammonium hydroxide, needed to synthesize the parent zeolite prior to Cu modification. Levyne offers significant cost reduction due to the potential use of lower cost templates. WO 2008/132452 discloses a CuNu-3 (Levyne-type) material with improved performance in comparison to Fe-Beta, but inferior NOx conversion when compared to CuSSZ-13 at 200 and 450° C. Additionally, Nu-3 does not realize cost benefits as methyl-quinuclidine is an expensive template. This invention improves on the performance seen for the CuLevyne reported in WO 2008/132452. This invention also delivers comparable catalytic performance and durability to CuSSZ-13 with reduced cost due to the use of less expensive template (diethyldimethylammonium hydroxide).

The invention claimed is:

1. A copper-containing Levyne molecular sieve having a silica to alumina mole ratio of from about 15 to about 26 and a Cu:Al atomic ratio of from about 0.20 to about 0.45.

2. The copper-containing Levyne molecular sieve of claim 1, wherein the silica to alumina mole ratio is less than 23.

3. The copper-containing Levyne molecular sieve of claim 1, wherein the atomic ratio of copper to proton is less than 7.

4. The copper-containing Levyne molecular sieve of claim 1, wherein moles Cu per 100 g zeolite (calculated as moles) are more than 0.01.

5. The copper-containing Levyne molecular sieve of claim 1, wherein Cu content of the copper containing Levyne molecular sieve, calculated as CuO, is from about 2 to about 4 wt.-% based on the total weight of the calcined Levyne molecular sieve.

6. The copper-containing Levyne molecular sieve of claim 1, wherein the Cu:Al atomic ratio is from about 0.2 to about 0.4.

7. The copper-containing Levyne molecular sieve of claim 1, wherein the Levyne molecular sieve is a ZSM-45.

8. The copper-containing Levyne molecular sieve of claim 1, wherein the Levyne molecular sieve is a Nu-3.

9. A catalyst containing the copper-containing Levyne molecular sieve of claim 1 disposed on a substrate.

* * * * *